US011484078B2

(12) United States Patent
O'Sullivan

(10) Patent No.: US 11,484,078 B2
(45) Date of Patent: Nov. 1, 2022

(54) KIT TO FACILITATE IDENTIFYING AT LEAST ONE GLOVE PARTICULARLY SUITABLE TO BE WORN BY A PARTICULAR INDIVIDUAL

(71) Applicant: Medline Industries, LP, Northfield, IL (US)

(72) Inventor: Megan O'Sullivan, Glenview, IL (US)

(73) Assignee: Medline Industries, LP, Northfield, IL (US)

( * ) Notice: Subject to any disclaimer, the term of this patent is extended or adjusted under 35 U.S.C. 154(b) by 251 days.

(21) Appl. No.: 15/004,229

(22) Filed: Jan. 22, 2016

(65) Prior Publication Data
US 2016/0213084 A1     Jul. 28, 2016

Related U.S. Application Data

(60) Provisional application No. 62/106,511, filed on Jan. 22, 2015.

(51) Int. Cl.
*A41H 1/02*     (2006.01)
*G06V 40/10*   (2022.01)

(52) U.S. Cl.
CPC ............... *A41H 1/02* (2013.01); *G06V 40/11* (2022.01)

(58) Field of Classification Search
CPC ............................ A41H 1/02; G06K 9/00382
USPC .......................................................... 348/77
See application file for complete search history.

(56) References Cited

U.S. PATENT DOCUMENTS

| 6,327,787 | B1* | 12/2001 | Bonzagni | A61B 5/1072 33/2 R |
| 8,512,615 | B1  | 8/2013  | Amdur | |
| 8,579,731 | B2* | 11/2013 | Gadiyar | A63B 57/00 473/407 |
| 2005/0006264 | A1* | 1/2005 | Low | A61B 42/40 206/438 |
| 2007/0085849 | A1* | 4/2007 | Kosolapov | G01B 11/2509 345/419 |
| 2012/0030928 | A1* | 2/2012 | Park | A41H 3/007 29/592 |
| 2013/0215116 | A1* | 8/2013 | Siddique | G06Q 30/0643 345/420 |

(Continued)

FOREIGN PATENT DOCUMENTS

DE   2011121086 A1 * 12/2015 ............. A43D 1/025

*Primary Examiner* — Amir Shahnami
(74) *Attorney, Agent, or Firm* — Fitch, Even, Tabin & Flannery LLP

(57) ABSTRACT

A kit to facilitate identifying at least one glove particularly suitable to be worn by a particular individual includes a backdrop having at least two visually-discernible calibration marks disposed thereon, a camera, a memory having stored therein characterizing parameters for a variety of different gloves, and a control circuit that operably couples to the latter. The control circuit presents to a kit user via a display an image of the particular individual's hand as placed on the backdrop, and then presents a plurality of user-placeable markers by which the kit user marks particular locations of the particular individual's hand. The control circuit then processes the image of the particular individual's hand as marked by the kit user and as a function of the two visually-discernible calibration marks to identify at least one glove that is particularly suitable to be worn by the particular individual.

16 Claims, 9 Drawing Sheets

(56) References Cited

U.S. PATENT DOCUMENTS

2014/0052567 A1* 2/2014 Bhardwaj .......... G06Q 30/0631
  705/26.7
2014/0354793 A1* 12/2014 Solheim .................... G06T 7/60
  348/77

* cited by examiner

Facility Name [    ]
Account Number [    ]   } 406
Date [    ]

Account Number

Product Lines — 401

402 — Latex

- [✓] Signature Glide
- 404 — [✓] Triumph
- [✓] Triumph LT
- [✓] Triumph Micro
- [✓] Triumph Classic
- [✓] Endermic
- [✓] Triumph Natural with Aloe 403 — Latex free

- [✓] SensiCare with Aloe Vera
- [✓] SensiCare LT with Aloe Vera
- [✓] SensiCare SLT
- [✓] SensiCare Green with Aloe Vera
- [✓] SensiCare Micro
- [✓] SensiCare Ortho
- [✓] SensiCare LT Custom Fit

405

[ CANCEL ]   [ SAVE ]   [ SAVE & ADD PERSON ]

| | | | |
|---|---|---|---|
| Doctor Name | Jim Smith | | |
| Title | Title ⇅ Surgeon | | |
| Specialty | | | |
| Current Glove | | | |
| Current Glove Size | Large | | |
| Grip Preference | Smooth | ☑ Texture *501* | It Doesn't Matter |
| Do you Double Glove | ☑ Yes with indicator *502* | Yes with Two Whites | No |
| Thickness Preference | Thin | ☑ Standard *503* | Ortho Thick |
| Material Preference | Latex | Latex Free | ☑ It Doesn't Matter *504* |

505 brackets the top fields; 501 brackets the preference rows.

[ CANCEL ]   [ SAVE ] *506*

Dr. Smith's Matches

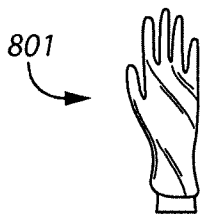

801 → Polyisoprene Powder Free
The World's First Polyisoprene Surgical Glove
  Smooth
  Standard thickness (9.8 mil)
  Ideal for general surgery ☑ Select
☑ Double Glove
Size
| 6.5 ⇅ | 7 ⇅ |

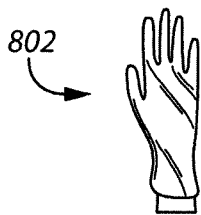

802 → Enhanced Grip Superior Dexterity
  Lightly textured
  Standard thickness (9.8 mil)
  Ideal for general surgery Select
Double Glove
Size
| 6 ⇅ |

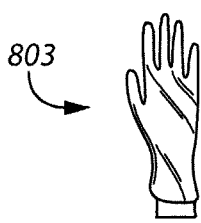

803 → Polyisoprene Powder Free
Improved Fit and Sensitivty
  Lightly textured
  Standard thickness (9.8 mil)
  Ideal for general surgery Select
Double Glove
Size
| 8 ⇅ |

[ SAVE ]
    804

[ SIGN OFF ]

SensiCare SensiCare Latex Free Powder Free Powder Free Surgical Gloves Polyisoprene, Powder Free

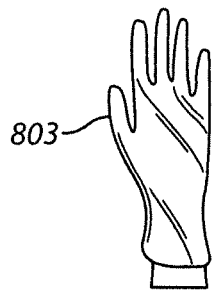

803

Description:

SensiCare SLT Sterile Latex Free Powder Free Polyisoprene Surgical Gloves are slightly thinner than SensiCare LT for enhanced tactile sensitivity.

Thinner than SensiCare LT, this glove is a standard lightly textured (SLT) option for surgeons who prefer a surgical glove with more sensitivity.

In addition, SensiCare SLT is cream colored and non aloe to satisfy advanced needs and provide yet another latex free alternative for your facility Glove specifications: latex polyisoprene material 9.1 mils thick. Lightly textured grip, cream color. Synthetic polymer coating donning agent.

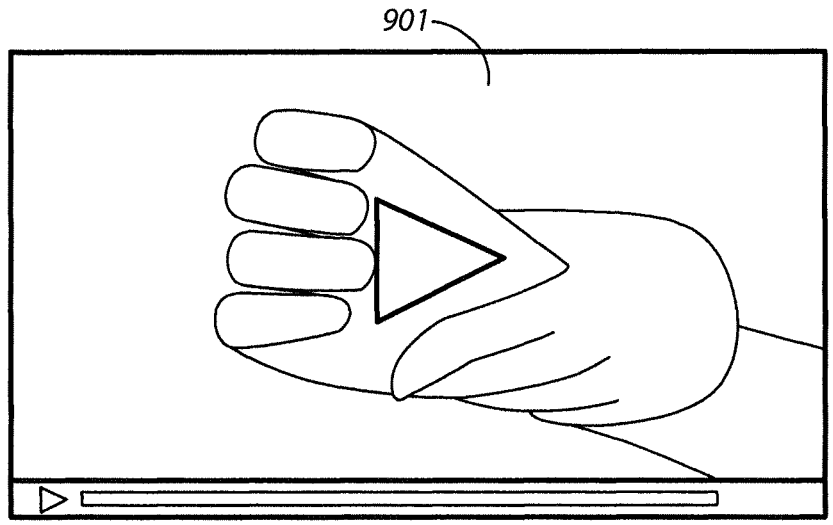

901

← BACK     EMAIL

KIT TO FACILITATE IDENTIFYING AT LEAST ONE GLOVE PARTICULARLY SUITABLE TO BE WORN BY A PARTICULAR INDIVIDUAL

RELATED APPLICATION(S)

This application claims the benefit of U.S. Provisional application No. 62/106,511, filed Jan. 22, 2015, which is incorporated by reference in its entirety herein.

TECHNICAL FIELD

These teachings relate generally to garment fitting and more particularly to identifying a particular glove that is well-suited to the dimensions of a particular person's hand.

BACKGROUND

When it comes to most wearable items, for the most part, one size does not fit all. Accordingly, some wearable items are custom tailored or otherwise manufactured to specifically accommodate the particular dimensions of a particular individual to assure a best fit. Unfortunately, a fully-customized approach is cost prohibitive for many such items.

It is therefore also known to manufacture a wearable item in a variety of sizes. Although any particular size may not exactly match a fully-custom solution for a given individual, the result is nevertheless often adequate. Accordingly, the vast majority of purchased wearable items are manufactured pursuant to such a scheme.

Unfortunately, such an approach, though indisputably popular and widely accepted, does not always meet all of the needs and requirements of a given application setting. Consider, for example, surgeon's gloves. Even a single manufacturing source for surgeon's gloves may provide versions that vary with respect to material, texture, thickness, and additives. When one then considers that surgeon's gloves may be offered in up to eight different sizes (denoted 5½ through 9 on a scale that is common to the United States and the United Kingdom), it becomes clear that there can be dozens or even hundreds of available gloves from even a single manufacturer that a surgeon might consider when attempting to identify a best glove for themselves. This plethora of choices can frustrate a person who has only limited time to devote to such a search. Worst case, the correct glove for a particular person may remain unidentified and unused.

BRIEF DESCRIPTION OF THE DRAWINGS

The above needs are at least partially met through provision of the kit to facilitate identifying at least one glove particularly suitable to be worn by a particular individual described in the following detailed description, particularly when studied in conjunction with the drawings, wherein:

FIG. 4 comprises a screenshot as configured in accordance with various embodiments of these teachings;

FIG. 5 comprises a screenshot as configured in accordance with various embodiments of these teachings;

FIG. 8 comprises a screenshot as configured in accordance with various embodiments of these teachings; and FIG. 9 comprises a screenshot as configured in accordance with various embodiments of the invention.

Figure 1:
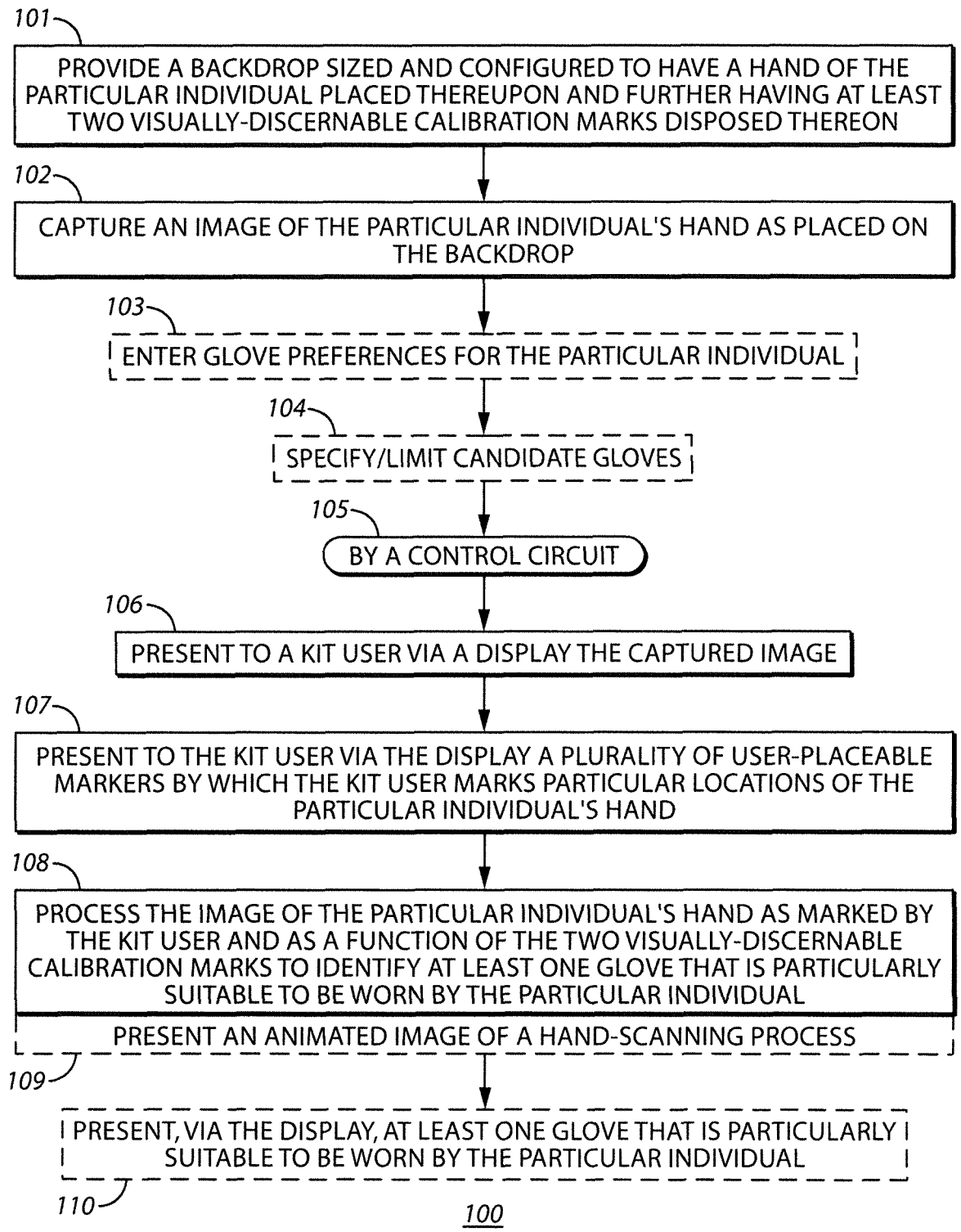
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a kit to facilitate identifying at least one glove particularly suitable to be worn by a particular individual can include a backdrop that is sized and configured to have a hand of the particular individual placed thereupon and which further has at least two visually-discernible calibration marks disposed thereon. This kit can also include a camera, a memory having stored therein characterizing parameters for each of a variety of different gloves, and a control circuit that operably couples to both the memory and to the camera. The control circuit is configured to present to a kit user via a display an image of the particular individual's hand as placed on the backdrop, and to then present to the kit user via the display a plurality of user-placeable markers by which the kit user marks particular locations of the particular individual's hand. The control circuit then processes the image of the particular individual's hand as marked by the kit user and as a function of the two visually-discernible calibration marks to identify at least one glove that is particularly suitable to be worn by the particular individual.

By one approach the aforementioned backdrop comprises a disposable sheet. This backdrop may have an outline of a human hand disposed thereon to serve as a hand-placement locator for the particular individual if desired. By one approach the aforementioned visually-discernible calibration marks are each disposed on opposite sides of the hand-placement locator. In any event, by one approach these visually-discernible calibration marks are intended to appear on either side of the particular individual's hand when the latter is placed on the backdrop as described above.

By one approach the aforementioned control circuit, memory, and camera can comprise integral parts of a shared platform. This shared platform can also include the aforementioned display if desired.

The aforementioned characterizing parameters for each of a variety of different gloves can include at least some parameters selected from the group of parameters comprising glove size, glove material, glove material texture, glove material thickness, and additives (including the lack thereof).

As noted above, the control circuit presents to the kit user a plurality of user-placeable markers in which the kit user marks particular locations of the particular individual's hand. These teachings are highly flexible in these regards, and in particular will accommodate a variety of differently shaped and/or colored markers and will also accommodate a variety of intended particular locations of the particular individual's hand. Examples of hand locations that can be useful include, but are not limited to, tips of the digits of the particular individual's hand, areas between the digits of the particular individual's hand, and locations that correspond to the width of the palm as corresponds to the particular individual's hand.

These teachings are highly flexible in other regards too. As one example, when processing the image of the particular individual's hand as marked by the kit user and as a function of the two visually-discernible calibration marks to identify at least one glove that is particularly suitable to be worn by the particular individual, these teachings will accommodate also presenting an animated image of a hand-scanning process if desired. As another example, these teachings will accommodate also storing in the aforementioned memory one or more glove preferences as correspond to the particular individual. Such preferences can represent, for example, preferences with respect to one or more of glove material, glove texture, double gloving, glove material thickness, and one or more glove additives to be favored or avoided.

When identifying at least one glove that is particularly suitable to be worn by the particular individual, these teachings will also accommodate, if desired, identifying at least two different gloves that are particularly suitable to be worn by the particular individual. By one approach the control circuit can be further configured to present, via the aforementioned display, these two or more different gloves (for example, in a prioritized order such that a most suitable glove is presented first).

So configured, such a kit will permit a person such as a surgeon to undergo a relatively brief measuring and evaluation process following which one or more especially appropriate selections are then identified for their consideration. Such a kit should be successfully usable by product representatives with only a modicum of training. If desired, it would even be possible to make this kit suitable for use by the individual who seeks that most appropriate glove for themselves. These teachings can be carried out in a highly economical fashion while providing very high quality results in a friendly and effective manner.

These and other benefits may become clearer upon making a thorough review and study of the following detailed description. Referring now to the drawings, and in particular to FIG. 1, an illustrative process 100 that is compatible with many of these teachings will now be presented. In particular, this process 100 will help to illustrate both the contents and use of a kit to facilitate identifying at least one glove that is particularly suitable to be worn by a particular individual.

Figure 2:
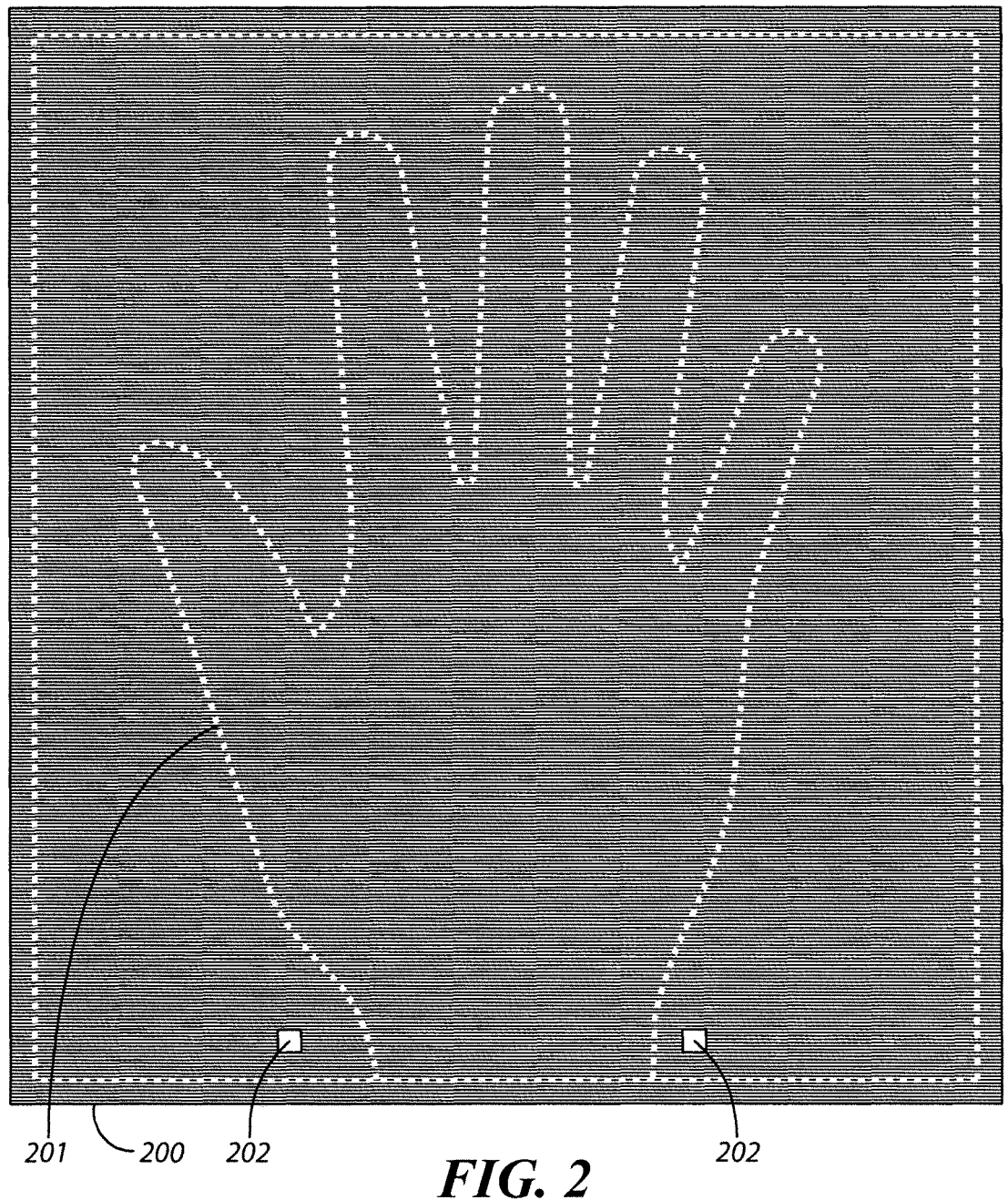
FIG. 2 comprises a top plan view as configured in accordance with various embodiments of these teachings.

At block 101 this process 100 provides a backdrop that is sized and configured to have a hand of the particular individual placed thereupon. FIG. 2 provides an illustrative example in these regards. In this example the backdrop 200 comprises a disposable sheet formed of any suitable material including but not limited to a paper product, a plastic film, a laminate, and so forth. By one approach each such backdrop 200 can be intended for a single use only. These teachings will also accommodate a more permanently configured backdrop 200. For example, the backdrop 200 may be comprised as an integral part of the side of a briefcase or the back side of a clipboard to note but two simple examples in these regards.

If desired, and as illustrated in FIG. 2, the backdrop 200 can include at least an outline 201 of a human hand disposed thereon. This outline 201 can serve as a hand-placement locator for the particular individual; that is, this outline 201 can serve by example as a nonverbal instruction to the particular individual regarding where, at least generally, their hand should be placed on the backdrop 200. Such an outline 201 can also serve as a non-verbal instruction that a particular hand of the individual is to be placed on the backdrop 200 (in the illustration of FIG. 2, this would be the individual's right hand as versus their left hand).

The backdrop 200 also includes at least two visually-discernible calibration marks 202 disposed thereon. In this particular example there are two such visually-discernible calibration marks 202 and they are disposed on opposite sides of the outline 201 that serves as the aforementioned hand-placement locator. These visually-discernible calibration marks 202 have a specific size and shape, and are located at a specific, predetermined distance from one another (in this example, the two visually-discernible calibration marks 202 are disposed 15 cm apart from one another). Accordingly, these visually-discernible calibration marks 202 and their relative distance from one another can serve as known quantities for the control circuit described below to employ when making other measurements of a captured image of the particular individual's hand.

As suggested above, there can be more than two visually-discernible calibration marks 202 as desired and the placement of those visually-discernible calibration marks 202 on the backdrop 200 can vary as desired. These teachings will also accommodate using, for example, a background regularly spaced grid as the visually-discernible calibration mechanism. So long as the resultant visually-discernible calibration marks 202 provide a valid basis for the aforementioned automated measurements, these teachings will accommodate a wide variety of modifications and alterations to the example provided in FIG. 2.

With continued reference to FIGS. 1 and 2, at block 102 the particular individual places their hand upon the backdrop 200 in an appropriate manner. For example, the outline 201 that serves as a hand-placement locator can help the particular individual place their hand roughly as shown. Placed in this manner, both of the visually-discernible calibration marks 202 will remain visible on either side of the particular individual's hand. This process 100 then provides for capturing an image of the particular individual's hand as placed on the backdrop 200.

At optional block 103 ("optional" in that this process 100 need not necessarily include this block), this process 100 will permit a kit user to enter glove preferences for the particular individual. FIG. 5 comprises a screenshot 500 that presents an illustrative, non-limiting example in these regards. This screenshot 500 represents an information-entry page presented, for example, by a corresponding computer application (often also referred to as an "app"). This information-entry page presents the kit user with a variety of glove preferences 501. In this example these glove preferences 501 include glove texture (specifically denoted here as "grip preference"), double gloving preference (which refers to whether the surgeon prefers to wear two gloves on a single hand, one glove over the other), glove material thickness, and glove material. These teachings will accommodate including additional preferences, such that as a preference regarding a glove additives such as Aloe Vera if desired. These teachings will also accommodate presenting fewer preferences.

In this example, each preference category has a corresponding plurality of checkbox opportunities. The glove preference category denoted as "grip preference," for example, has a checkbox opportunity for "smooth," "texture," and "it doesn't matter." Here, for the sake of example, the checkbox denoted by reference numeral 501 for "texture" has been selected to indicate this individual's corresponding preference. In a similar manner the checkbox denoted by reference numeral 502 indicates that this individual prefers double gloving "with indicator," the checkbox denoted by reference numeral 503 indicates that this individual prefers a standard thickness of glove material, and the checkbox denoted by reference numeral 504 indicates that this individual does not have a glove material preference.

By one approach these checkboxes can all be initially presented in an unchecked state. By another approach one or more of these checkboxes can be initially pre-checked as a default entry if desired. By yet another approach one or more of these checkboxes can be initially pre-checked based upon information previously gleaned for this particular individual and/or this particular service facility (which may have mandatory policies regarding, for example, such things as double gloving).

If desired, such an information-entry page can accommodate other information-entry opportunities as well. By way of example, the illustrated information-entry page includes a number of other information-entry fields 505 including a field for the individual's name, their title, their specialty area of practice, information regarding their current glove of choice, and their current glove size. A save button 506 permits the kit user to save the entered information.

Referring again to FIG. 1, this process 100 will also accommodate, as illustrated at block 104, the optional step of permitting the kit user to specify and/or limit the candidate gloves that are available for consideration by this process 100. FIG. 4 provides a screenshot 400 offering an illustrative example in these regards. In this example the information-entry page represented by this screenshot 400 includes a plurality of product lines 401 including a plurality of gloves formed using latex 402 and a plurality of gloves formed without using latex 403. Each of the represented product lines includes a corresponding checkbox (a few of these checkboxes being denoted by reference numeral 404). In this example checking the checkbox for a particular glove will include the glove as a candidate for consideration per this process 100. If the checkbox for a particular glove is not checked, however, the glove will not be considered as a candidate for use by the particular individual.

By one approach all of the checkboxes can be checked, or unchecked, as a default state as desired. These teachings will also accommodate checking some, but not all, of the checkboxes as a default state.

As before, asserting a save button 405 permits the kit user to save and hence use the selected information entries going forward. Also as before, these teachings will again accommodate presenting other information-entry fields 406. Examples in these regards include a field to accommodate the name of the facility, an account number if applicable, the current date, and so forth.

Figure 3:
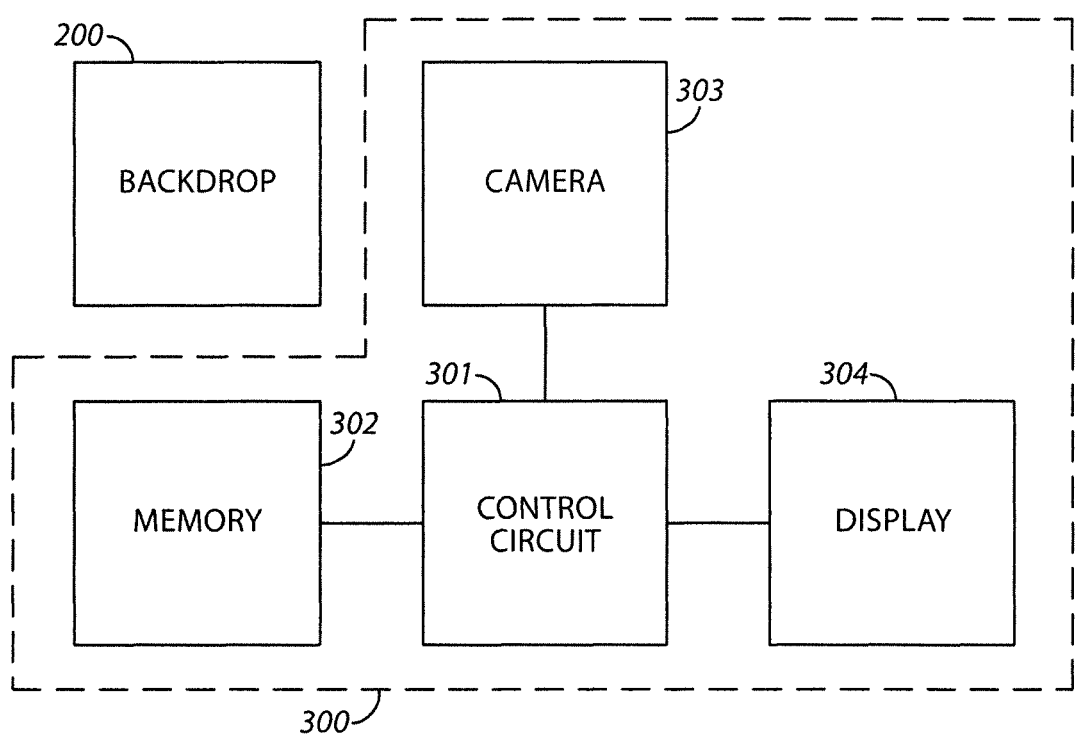
FIG. 3 comprises a block diagram as configured in accordance with various embodiments of these teachings.

Referring again to FIG. 1, and in particular to block 105, the remaining steps of this process 100 can be carried out by a control circuit of choice. FIG. 3 provides an illustrative example in these regards. In this example the control circuit 301 can comprise a fixed-purpose hard-wired platform or can comprise a partially or wholly programmable platform. These architectural options are well known and understood in the art and require no further description here. This control circuit 301 is configured (for example, by using corresponding programming as will be well understood by those skilled in the art) to carry out one or more of the steps, actions, and/or functions described herein.

This control circuit 301 operably couples to a memory 302 that may be integral to the control circuit 301 or can be physically discrete (in whole or in part) from the control circuit 301 as desired. This memory 302 can also be local with respect to the control circuit 301 (where, for example, both share a common circuit board, chassis, power supply, and/or housing) or can be partially or wholly remote with respect to the control circuit 301 (where, for example, the memory 302 is physically located in another facility, metropolitan area, or even country as compared to the control circuit 301).

This memory 302 can serve, for example, to store the characterizing parameters for each of a variety of different gloves. In particular, these characterizing parameters can pertain to gloves that are available for consideration, per this process, when identifying at least one glove that is particularly suitable to be worn by the particular individual. Useful characterizing parameters for each of a variety of different gloves include, but are not limited to, parameters comprising glove size, glove material, glove material texture, glove material thickness, and additives.

This memory 302 can also serve to non-transitorily store the computer instructions that, when executed by the control circuit 301, cause the control circuit 301 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 301 also operably couples to a camera 303. In this example the camera 303 comprises a digital camera 303. This camera 303 can serve, for example, to capture the image of the particular individual's hand when placed on the backdrop as described above at block 102 of this process 100.

In this example the control circuit 301 also operably couples to a display 304 such as a touch-sensitive flatscreen display. Such a display 304 can serve to present the screenshots described herein and to receive the kit user's corresponding selections and other interactions.

By one approach the aforementioned components can be non-integral to one another. By another approach, and as presumed herein, these various components comprise integral parts of a shared platform 300. By one approach this shared platform 300 comprises a pad or tablet-styled computer such as the well-known iPad® tablet.

Figure 6:
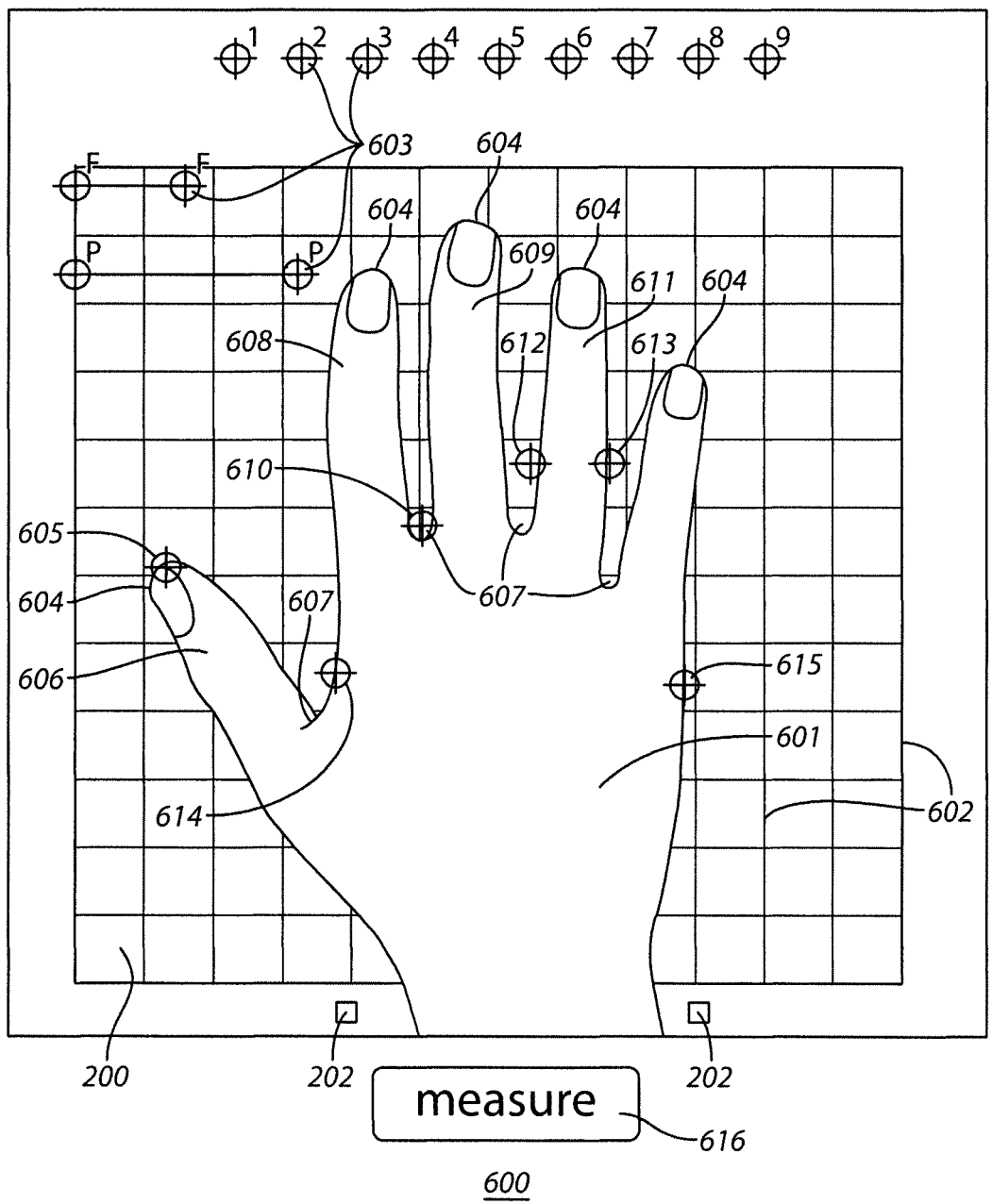
FIG. 6 comprises a screenshot as configured in accordance with various embodiments of these teachings.

At block 106 of FIG. 1, the control circuit 301 presents to a kit user, via the aforementioned display 304, the captured image of the particular individual's hand as placed on the backdrop 200. FIG. 6 presents a screenshot 600 that offers an illustrative example in these regards. In this example the particular user's hand 601 is shown atop a backdrop 200 that includes both the two aforementioned visually-discernible calibration marks 202 and a regularly spaced grid pattern 602.

At block 107 of FIG. 1, and with continued reference to the screenshot 600 shown at FIG. 6, the control circuit 301 also presents to the kit user, simultaneously with presenting the captured image of the particular individual's hand 601 on the backdrop 200, a plurality of user-placeable markers (a few of which are denoted by reference numeral 603). The kit user employs these user-placeable markers 603 to mark particular locations of the particular individual's hand 601. In this example these user-placeable markers 603 each comprise a pair of crossed lines (oriented orthogonally to one another) within a circle. The intersection of the two lines denotes the specific location being marked by a given one of these user-placeable markers 603.

Presuming a touch-sensitive display 304, the kit user can move any of these user-placeable markers 603 by simply touching a particular one of the user-placeable markers 603 and then sliding the touching finger to the desired location to thereby drag the user-placeable marker 603 to that desired location. Upon lifting that finger the user-placeable marker 603 will remain in its new position.

The purpose of presenting these user-placeable markers 603 is to have the kit user mark particular locations of the particular individual's hand 601. The purpose of marking those particular locations, in turn, is to then permit the control circuit 301 to use those marked locations to make various measurements of the particular individual's hand 601.

In the present illustrative example the kit user uses the user-placeable markers 603 to mark the tips 604 of the digits of the particular individual's hand 601. As illustrated, the tip 604 of the individual's thumb 606 has been marked by a user-placeable marker denoted by reference numeral 605.

In the present illustrative example the kit user also uses the user-placeable markers 603 to mark the areas 607 between the digits of the particular individual's hand 601. As illustrated, the area 607 between the individual's index finger 608 and middle finger 609 has been marked by a user-placeable marker denoted by reference numeral 610.

In the present illustrative example the kit user further uses the user-placeable markers 603 to mark the width of each finger. For example, the kit user places one of the user-placeable markers 603 on either side of each finger approximately 10 mm below the middle knuckle. As illustrated, these locations for the particular individual's ring finger 611 are marked by user-placeable markers denoted by reference numerals 612 and 613.

And lastly, in the present illustrative example the kit user uses the user-placeable markers 603 to mark the width of the particular individual's palm. For example, the kit user places one of the user-placeable markers 603 on either side of the palm approximately 10 mm below the last knuckle (excluding the thumb). As illustrated, these locations are marked by user-placeable markers denoted by reference numerals 614 and 615.

These teachings will accommodate a variety of modifications to that described above. For example, it may not be necessary in a particular application setting to measure the width of each finger. As another example, it may be useful in a given application setting to measure the width of a given finger at more than one location or at a different location than where measured for the other fingers.

By one approach the user-placeable markers 603 are visually identical to one another. In that case the control circuit 301 is configured to intuit what particular parts of the particular individual's hand 601 are represented by each user-placeable marker 603 by their respective positions to one another. By another approach at least some of the user-placeable markers 603 are visually distinct from one another. For example, markers intended to be placed at the tips of the digits could all be a color that is different than the colors used for the other markers. In addition, or in lieu of the foregoing, the marker could include a symbol (such as the letter "T") that the control circuit can recognize as corresponding to the tip of a digit.

By one approach all of the user-placeable markers 603 are simultaneously presented and available to the kit user for placement. By another approach the user-placeable markers 603 are presented one at a time, with a next marker not being presented until the kit user has moved a presently available marker to its intended location. In this case it may be helpful to present on the display 304 text and/or illustrated instructions regarding where the present marker should be placed. By yet another approach the user-placeable markers 603 may be presented in relevant groups. For example, the five markers to be placed at the tips of the digits may all be first presented with the remaining markers not being shown until those five markers have been placed at the tips of the digits. Other possibilities in these regards exist and can be readily accommodated by these teachings as well.

If desired, it can be mandatory that all of the specified locations be so marked. By another approach, however, only some of the locations may be mandatory while other of the locations may be optional. These teachings would also accommodate, if desired, having all of the locations be optional rather than mandatory.

Upon placing all of the user-placeable markers 203 as described above, the kit user then asserts a "measure" button 616. Asserting this button 616 closes the above-described opportunity to place the user-placeable markers 603 and initiates block 108 of the process 100. Accordingly, the control circuit 301 processes the image of the particular individual's hand 602 as marked by the kit user and also as a function of the two visually-discernible calibration marks 202 to identify at least one glove that is particularly suitable to be worn by the particular individual.

From the standpoint of size, this activity includes determining various relevant measurements of the individual's hand 602 based upon the above-described visually-discernible calibration marks 202 and the suitably-located user-placeable markers 603. Comparing those measurements to corresponding measurements for various candidate gloves the control circuit 301 is able to identify the closest, best-fitting size for each candidate glove. In some cases, it is possible that the measured dimensions match a particular size of a particular glove. In that case that particular size can be identified as the "correct" size for that glove.

In other cases, the measured dimensions may fall between the dimensions for two incremental sizes of a particular glove. The control circuit 301 can be configured to select either the smaller or larger size as desired. For example, by one approach the control circuit 301 can be configured to always select the next larger size. As another example, the control circuit 301 can be configured to select the next larger size except when the actual measurements are within, say, 10% or 20% of the next smaller size, in which case the control circuit 301 can be configured to select the next smaller size. Other decision-making criteria can be employed to suit the application setting as desired. These teachings will also accommodate using different decision-making criteria depending upon the glove itself. For example, for some glove materials and/or thicknesses, it may be best to always choose the next larger size when the actual measurements do not accord exactly with an existing glove size.

As noted above, these teachings will accommodate receiving glove preferences for the particular individual.

These preferences regarding such things as material, texture, double gloving, thickness, and additives can also be taken into account by the control circuit 301 when working to identify the glove that is most particularly suitable to be worn by this particular individual. Accordingly, when the particular individual has a preference for a textured glove (for example), the control circuit 301 may identify as being "better" a textured glove that does not comport as well with the particular individual's hand measurements in comparison to a non-textured glove that comports better with the particular individual's hand measurements.

By one approach, each espoused glove preference can be treated as having equal weight with other espoused glove preferences. By another approach one or more of the espoused glove preferences can be weighted to have either greater or lesser eight in the considerations of the control circuit 301. This weighting can either be predetermined and fixed or can be dynamically established, for example, by the kit user and/or the particular individual being fitted.

Figure 7:
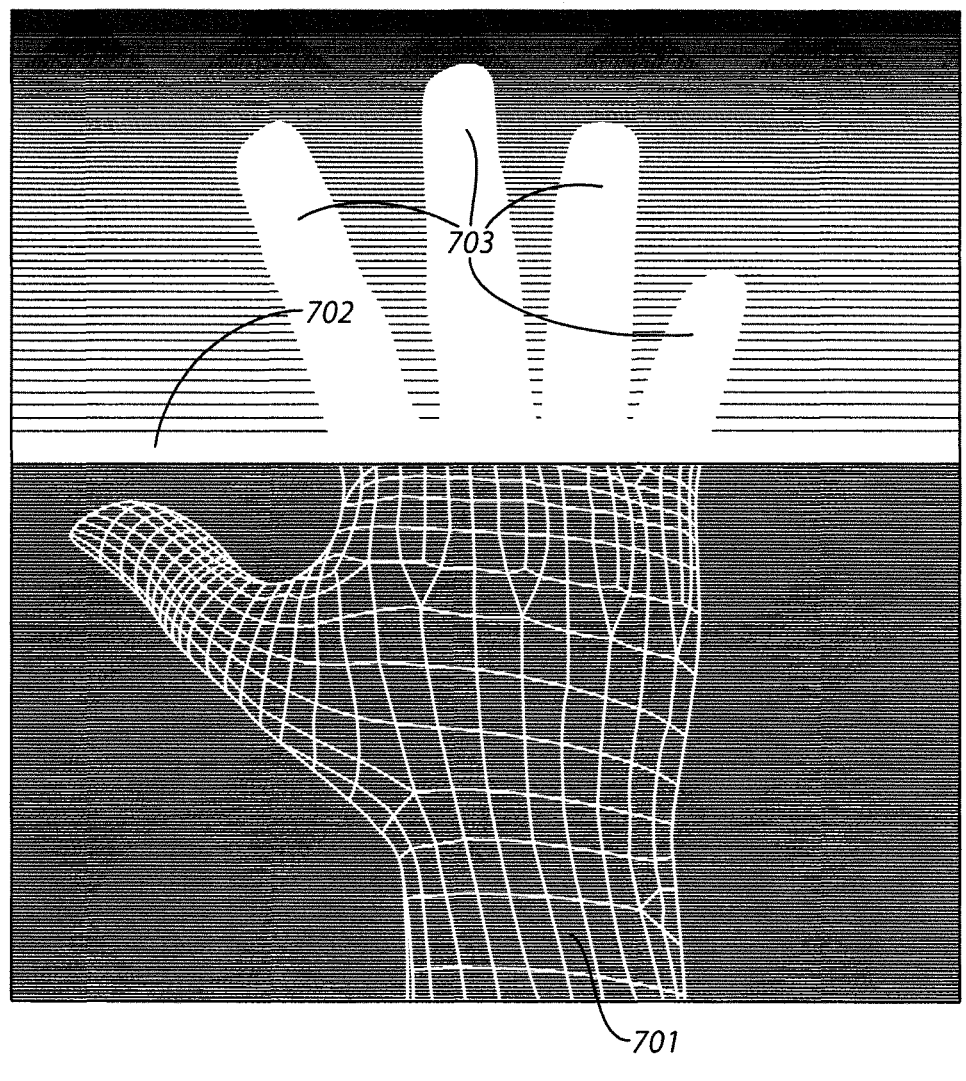
FIG. 7 comprises a screenshot as configured in accordance with various embodiments of the invention.

By one optional approach, and while processing the image as described above, this process 100 can present (at optional block 109) an animated image of a hand-scanning process on the aforementioned display 304. FIG. 7 presents a screenshot 700 that provides an illustrative example in these regards. In this example, a wireframe image of a hand 701 (which need not correspond to the particular individual's hand in any particular intended regard) appears on the display and a white horizontal line 702 moves downwardly on the display. As the white horizontal line 702 traverses the features of the hand 701, the traversed features convert to a uniform white color.

Such an animated display is not, of course, an actual scanning process nor even, in this context, necessarily an accurate portrayal of the measuring processes conducted by the control circuit 301. This animated hand-scanning process will, however, help convey to the kit user (and also the particular individual being fitted for a glove) the general sense that the control circuit 301 is processing the information regarding the particular individual's hand. Accordingly, it will be understood that the specific animated image described here is intended to serve only in an illustrative capacity. In fact, these teachings will accommodate a wide variety of animations or the like that will convey a similar sensibility.

Per this process 100, the control circuit 301 will eventually identify a glove that appears to be most particularly suitable to be worn by the particular individual. This identified glove will presumably meet the various espoused preferences of the particular individual and will also represent a best fit for the available glove. At block 110 the control circuit 301 can optionally present, via the display 304, this identified glove.

Although there may be one "best" glove per the calculations of the control circuit 301, there may also be one or more other gloves that would also likely work well. Accordingly, if desired, these teachings will accommodate identifying at least two different gloves that are both particularly suitable to be worn by the particular individual (albeit one may be "better") and then presenting all or some of those different gloves via the display 304. By one approach this can comprise presenting the different gloves in a prioritized order such that a most suitable glove appears first.

FIG. 8 presents a screenshot 800 that illustrates such a presentation. In this example the screenshot 800 presents three different gloves that are all particularly suitable to be worn by the particular individual. That said, the glove presented first (i.e., in this display, at the top of the listing) also constitutes the most particularly suitable glove for this particular individual's hand.

By one approach the aforementioned presentation presents a recommended glove size with each of the presented gloves. For example, the first-presented glove 801 is presented with size 6.5 and 7 (the two sizes being shown as the "double glove" option is checked in this example). Similarly, the second-presented glove 802 is presented with size 6 and the third-presented glove 803 is presented with size 8. (These different sizes help to illustrate that sizing can and will vary between glove lines, sometimes considerably.)

By one approach, part or all of each displayed glove presentation can constitute an active link. When asserted by the kit user and/or the particular individual, the clicked link can lead to greater information regarding that particular glove. FIG. 9 presents an illustrative screenshot 900 for the third-presented glove 803 shown in FIG. 8. This additional information can include additional illustrations, additional text, and even a corresponding audiovisual presentation 901 to, for example, demonstrate one or more useful characteristics of the glove, present one or more user testimonials, and so forth.

Referring again to FIG. 8, each glove presentation in this example includes a checkbox to permit selection of that particular glove. In this example the first-presented glove 801 has that checkbox checked. Accordingly, if the kit user now asserts the save button 804 that particular glove selection will be saved. By one approach, that selection information can be preloaded into an order-taking application to permit the particular individual to order a particular quantity of the identified and selected glove.

By one approach the selection checkbox for the most-appropriate glove can be pre-checked upon opening this page. By another approach, all of the selection checkboxes for all of the gloves can be unchecked when this page first opens. If desired, the control circuit 301 may permit only one glove to be selected before saving. By another approach, the control circuit 301 will permit more than one of the presented gloves to be selected (to accommodate a situation where, for example, the particular individual would like a sample of all three presented gloves to physically try them out).

These teachings do not yield a customized glove, nor is that the intent. Instead, these teachings permit an easy, efficient, and quick way to determine which glove or gloves from amongst a potentially very large number of different existing gloves may be best suited for a particular individual. These teachings are able to make this assessment and determination based not only upon various measurements of the particular individual's hand but as a function of various personal preferences of that individual and/or their workplace.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A kit to facilitate identifying at least one existing, non-customized glove suitable to be worn by a particular individual, the kit comprising:
   a backdrop sized and configured to have a hand of the particular individual placed thereupon and further having:
   a regularly-spaced grid disposed thereon;

an outline of a human hand disposed thereon to serve as a hand-placement locator for the particular individual; and at least two visually-discernable calibration marks disposed thereon apart from the grid and a predetermined known distance from one another, the at least two visually-discernable calibration marks each being disposed on opposing sides of the hand-placement locator;

a camera;

a memory having stored therein characterizing parameters for each of a variety of different existing, non-customized gloves and further having stored therein at least one glove preference regarding double gloving as corresponds to the particular individual;

a control circuit operably coupled to the memory and to the camera and configured to:

present to a kit user via a display an image of the particular individual's hand as placed on the backdrop;

present to the kit user via the display a plurality of user-placeable markers by which the kit user marks particular locations of the particular individual's hand;

process the image of the particular individual's hand as marked by the kit user and as a function of the predetermined known distance between the two visually-discernable calibration marks and as a further function of the at least one glove preference to identify at least one existing, non-customized glove that is suitable to be worn by the particular individual.

2. The kit of claim 1 wherein the backdrop comprises a disposable sheet.

3. The kit of claim 1 wherein the predetermined known distance is 15 cm.

4. The kit of claim 1 wherein the outline of the human hand includes a wrist, and wherein the at least two visually-discernable calibration marks are each disposed on opposing sides of the wrist.

5. The kit of claim 1 wherein control circuit, memory, and camera comprise integral parts of a shared platform.

6. The kit of claim 1 wherein the characterizing parameters for each of a variety of different existing, non-customized gloves include at least some parameters selected from the group of parameters comprising:

glove size;
glove material;
glove material texture;
glove material thickness; and
additives.

7. The kit of claim 1 wherein the control circuit is further configured, while processing the image of the particular individual's hand as marked by the kit user and as a function of the predetermined known distance between the two visually-discernable calibration marks to identify at least one glove that is suitable to be worn by the particular individual, and via the display, to present an animated image of a hand-scanning process.

8. The kit of claim 1 wherein the particular locations of the particular individual's hand that the kit user is to mark with the user-placeable markers include tips of the digits of the particular individual's hand.

9. The kit of claim 8 wherein the particular locations of the particular individual's hand that the kit user is to mark with the user-placeable markers further include areas between the digits of the particular individual's hand.

10. The kit of claim 9 wherein the particular locations of the particular individual's hand that the kit user is to mark with the user-placeable markers further include the width of the palm as corresponds to the particular individual's hand.

11. The kit of claim 1 wherein the at least one glove preference comprises at least one additional glove preference with respect to at least one of:

a glove material;
a glove texture; a preference
glove material thickness; and
a glove additive.

12. The kit of claim 1 wherein the control circuit is further configured to identify at least two different existing, non-customized gloves that are suitable to be worn by the particular individual.

13. The kit of claim 12 wherein the control circuit is further configured to present, via the display, the at least two different existing, non-customized gloves that are suitable to be worn by the particular individual.

14. The kit of claim 13 wherein the control circuit is further configured to present the at least two different existing, non-customized gloves in a prioritized order such that a most suitable glove is presented first.

15. The kit of claim 13 wherein the control circuit is further configured to present a recommended glove size with each of the at least two different existing, non-customized gloves.

16. The kit of claim 1 wherein the control circuit is further configured to provide the kit user with an opportunity to specify the different existing, non-customized gloves that are available for the control circuit to consider when identifying the at least one existing, non-customized glove that is suitable to be worn by the particular individual.

* * * * *